United States Patent
Tan

(10) Patent No.: US 10,611,936 B2
(45) Date of Patent: Apr. 7, 2020

(54) METHOD FOR MAKING LOW V.O.C. CONSTRUCTION ADHESIVE

(71) Applicant: Nan Pao Resins Chemical Co., Ltd., Tainan (TW)

(72) Inventor: Joo Sing Tan, West Denistone (AU)

(73) Assignee: Nan Pao Resins Chemical Co., Ltd., Tainan (TW)

(*) Notice: Subject to any disclaimer, the term of this patent is extended or adjusted under 35 U.S.C. 154(b) by 0 days.

(21) Appl. No.: 16/354,256

(22) Filed: Mar. 15, 2019

(65) Prior Publication Data

US 2019/0211240 A1    Jul. 11, 2019

Related U.S. Application Data

(63) Continuation-in-part of application No. 15/610,677, filed on Jun. 1, 2017, now abandoned.

(51) Int. Cl.

| | | |
|---|---|---|
| C09J 11/06 | (2006.01) | |
| C09J 109/06 | (2006.01) | |
| C09J 109/08 | (2006.01) | |
| C09J 125/10 | (2006.01) | |
| C09J 153/02 | (2006.01) | |
| C09J 11/04 | (2006.01) | |
| C08K 3/26 | (2006.01) | |
| C08K 3/34 | (2006.01) | |

(Continued)

(52) U.S. Cl.
CPC ............ *C09J 153/02* (2013.01); *C09J 11/04* (2013.01); *C09J 11/06* (2013.01); *C08K 3/26* (2013.01); *C08K 3/346* (2013.01); *C08K 3/36* (2013.01); *C08K 5/053* (2013.01); *C08K 2003/265* (2013.01); *C09J 109/06* (2013.01); *C09J 109/08* (2013.01); *C09J 125/10* (2013.01)

(58) Field of Classification Search
None
See application file for complete search history.

(56) References Cited

U.S. PATENT DOCUMENTS

| 2005/0187343 A1* | 8/2005 | DuBois | A61L 15/585 525/63 |
| 2017/0297302 A1* | 10/2017 | Okimura | B32B 27/00 |

FOREIGN PATENT DOCUMENTS

WO    WO-2018183990 A1 * 10/2018

OTHER PUBLICATIONS

Ullmann's Encyclopedia of Industrial Chemistry. Resins, Synthetic. 2012. vol. 31, pp. 495-519.Wiley-VCH Verlag GmbH & Co. KGaA, Weinheim. (Year: 2012).*

(Continued)

*Primary Examiner* — Richard A Huhn
(74) *Attorney, Agent, or Firm* — Alan D. Kamrath; Karin L. Williams; Mayer & Williams PC

(57) ABSTRACT

The present invention relates to a method for making low VOC construction adhesive. It could pass VOC regulation of Californian Rule 1168 SCAQMD which VOC content <70 g/L. The procedure is using solvent to dissolve petroleum resin and styrene-butadiene rubber first. Then add filler to stir properly. During production, the temperature must be controlled under 40° C. In order to make VOC content <70 g/L, we choose methyl acetate, cyclohexane, and acetone as raw materials. Methyl acetate and acetone are exempt solvent in Californian Rule 102 SCAQMD. When calculating VOC content of adhesive, methyl acetate and acetone are not included.

1 Claim, 1 Drawing Sheet

(51) Int. Cl.
 *C08K 5/053* (2006.01)
 *C08K 3/36* (2006.01)

(56) References Cited

OTHER PUBLICATIONS

Product webpage for UPM Suntack SK-120 dated Feb. 28, 2015. Retrieved from web.archive.org on Jul. 7, 2019. (Year: 2015).*
Neville Chemical Company Interactive Brochure. May 2016. (Year: 2016).*

* cited by examiner

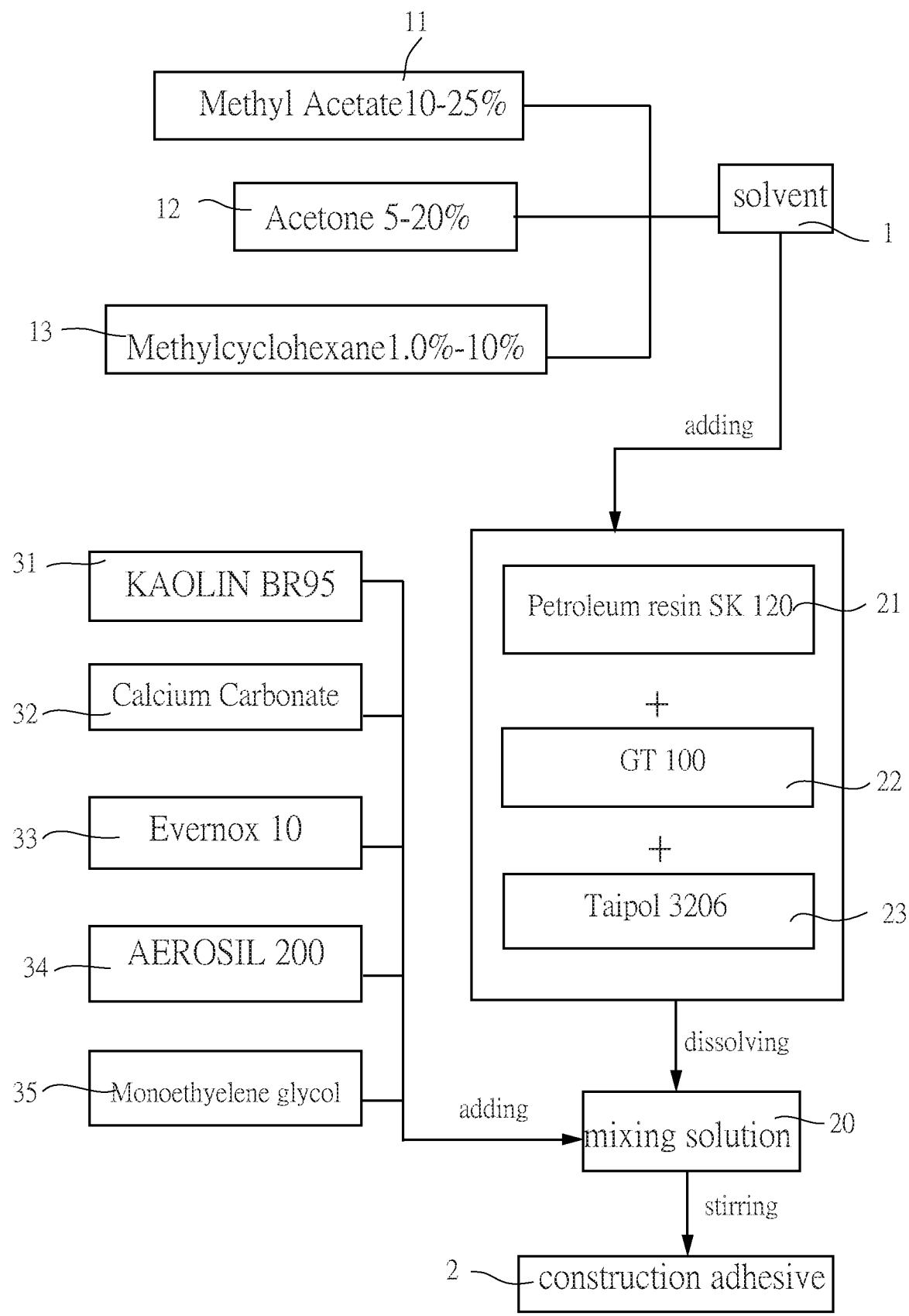

METHOD FOR MAKING LOW V.O.C. CONSTRUCTION ADHESIVE

CROSS-REFERENCES TO RELATED APPLICATIONS

The present invention is a continuation-in-part (C.I.P.) application of the co-pending U.S. Ser. No. 15/610,677, filed on Jun. 1, 2017, now abandoned.

BACKGROUND OF THE INVENTION

1. Field of the Invention

The present invention relates to a method for making low V.O.C. of less than 70 g per liter product construction adhesive (VOC stands for volatile organic compound).

2. Description of the Related Art

Construction adhesive is commonly used in construction area. Common substrates are plywood, timber, MDF, plaster board, concrete, ceramic tiles, bricks, metals and mirror installation. In addition, construction adhesive is applied from cartridges and sausage with extrusion gun.

However, conventional construction adhesive contains volatile organic compounds (V.O.C.), toluene, ethyl benzene, xylene, or the like that contribute to smog buildup in the environment that causes short and long term health effects.

Health effects may include:
Eye, nose and throat irritation
headaches, loss of coordination and nausea
damage to liver, kidney and central nervous system
Some organics can cause cancer in animals, some are suspected or known to cause cancer in humans.
Key signs or symptoms associated with exposure to VOCs include:
conjunctival irritation
nose and throat discomfort
headache
allergic skin reaction
dyspnea
declines in serum cholinesterase levels
nausea
emesis
epistaxis
fatigue
dizziness.

BRIEF SUMMARY OF THE INVENTION

The primary objective of the present invention is to provide a method for making low V.O.C. (volatile organic compound) construction adhesive.

The following are the component and procedure for producing low V.O.C. (volatile organic compound) construction adhesive.
1. loading solvents to mixer.
2. Load SBS, C9 resins, Kaolin, Anti-oxidants. Start mixing to disperse and dissolve it. That takes about 30 minutes.
3. Stop mixing, load C5+C9 copolymer and the rest of C9 resin. Mix for 15 minutes.
4. Load CaCO3 filler and the rest of kaolin. Mix for 15 minutes.
5. Load fumed Silica and mix for 3 minutes.
6. Load Mono-ethylene glycol, mix 2 minutes.

Ingredients
1. Solvent includes methyl 10-25% methyl acetate, 5-20% acetone and 1.0-20% methyl cyclohexane.
2. Resins used are: C9 hydrocarbon resin, C5 and C9 copolymer
3. SBS triblock (styrene Butadiene styrene)
4. Fumed silica—Aerosil 200 or similar
5. Antioxidant—Evernox 10 or similar
6. Monoethylene glycol.

Solvent Composition

| Component | Description | CAS No. | wt % range |
| --- | --- | --- | --- |
| Methyl Acetate | Solvent | 79-20-9 | 10-25% |
| Acetone | Solvent | 67-64-1 | 5-20% |
| Methyl cyclohexane | Solvent | 108-87-2 | 1.0-10% |

Our VOC content of our Low VOC Construction is less that 70 gm/liter product. It meets the specification of California Rule 1168 SCAQMD.

Another advantage of the present invention, the construction adhesive is fast drying adhesive that squeezed easily and quick setting time, also can enhance work efficiency.

Further benefits and advantages of the present invention will become apparent after a careful reading of the detailed description with appropriate reference to the accompanying drawings.

BRIEF DESCRIPTION OF THE SEVERAL VIEWS OF THE DRAWING

FIG. 1 is a flow chart of a method for making a low V.O.C. construction adhesive in accordance with the preferred embodiment of the present invention.

DETAILED DESCRIPTION OF THE INVENTION

Referring to FIG. 1, the method for making a low V.O.C. construction adhesive in accordance with the preferred embodiment of the present invention comprises first step (1) of preparing solvent 1, second step (2) is to add solvent 1 into a mixture to dissolve the mixture and form the mixing solution 20, third step (3) is add filler and additive into the mixing solution 20. All mixing procedure is in a three-shaft mixer, and temperature is controlled under 40°.

In the first step (1), the solvent 1 includes 10-25% (weight proportion) methyl acetate 11, 5-20% (weight proportion) acetone 12 and 1.0-10% (weight proportion) methyl cyclohexane 13, and the weight proportions of methyl acetate 11, acetone 12 and methyl cyclohexane 13 of the solvent 1 are based upon the total amount of the construction adhesive.

In the second step (2), the mixture includes C9 hydrocarbon resin 21, C5 and C9 co-polymer hydrocarbon resin 22 and styrene-butadiene rubber 23. Preferably, the C9 hydrocarbon resin 21 is petroleum resin SK 120. Preferably, the C5 and C9 co-polymer hydrocarbon resin 22 is GT 100. Preferably, the styrene-butadiene rubber 23 is Taipol 3206. The mixing solution 20 contains the solvent 1 and the mixture that is dissolved by the solvent 1.

In the third step (3), the filler includes calcined kaolin 31, calcium carbonate 32, anti-oxidant 33 and fumed silica 34. Preferably, the calcined kaolin 31 is Kaolin BR95. Preferably, the anti-oxidant 33 is Evernox 10. Preferably, the fumed silica 34 is aerosil 200. The additive includes monoethylene glycol 35.

In practice, methyl acetate 11, acetone 12 and methyl cyclohexane 13 are mixed in a predetermined proportion to form the solvent 1, so that the content of the V.O.C. (volatile organic compound) contained in the construction adhesive 2 is controlled at an allowed range, preferably, the V.O.C. content <70 g/L, so as to satisfy the regulations of California Rule 1168 SCAQMD.

The composition of solvent used are listed below: —

| Component | Description | CAS No. | wt % range |
|---|---|---|---|
| Methyl Acetate | Solvent | 79-20-9 | 10-25% |
| Acetone | Solvent | 67-64-1 | 5-20% |
| Methyl cyclohexane | Solvent | 108-87-2 | 1.0-10% |

Methyl acetate 11 and acetone 12 are exempted solvent that satisfy the regulations of California Rule 102 SCAQMD. Thus, the methyl acetate 11 and the acetone 12 are not considered in calculation of the V.O.C. content in the construction adhesive.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A method for making a construction adhesive, comprising:
   a first step of preparing a solvent;
   a second step of adding the solvent into a mixture to dissolve the mixture and to form a mixing solution;
   a third step of adding a filler and an additive into the mixing solution; and
   a fourth step of using a three-shaft mixer to stir and blend the solvent, the filler, the mixing solution and the additive to form a construction adhesive;
   wherein:
   the temperature is controlled under 40° C. in the first step, the second step, the third step and the fourth step;
   the solvent includes methyl acetate with a weight proportion of 10-25%, acetone with a weight proportion of 5-20% and methyl cyclohexane with a weight proportion of 1.0-10%;
   the weight proportions of methyl acetate, acetone and methyl cyclohexane of the solvent are based upon a total amount of the construction adhesive;
   the mixture includes C9 hydrocarbon resin, C5 and C9 co-polymer hydrocarbon resin and styrene-butadiene copolymer;
   the mixing solution contains the solvent and the mixture that is dissolved by the solvent;
   the filler includes calcined kaolin, calcium carbonate, anti-oxidant and fumed silica; and
   the additive includes monoethylene glycol.

* * * * *